United States Patent
Khojastepour et al.

(10) Patent No.: US 12,009,891 B2
(45) Date of Patent: Jun. 11, 2024

(54) CODEBOOK DESIGN FOR COMPOSITE BEAMFORMING IN NEXT-GENERATION mmWave SYSTEMS

(71) Applicant: NEC Laboratories America, Inc., Princeton, NJ (US)

(72) Inventors: Mohammad Khojastepour, Lawrence, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/948,624

(22) Filed: Sep. 20, 2022

(65) Prior Publication Data

US 2023/0092742 A1     Mar. 23, 2023

Related U.S. Application Data

(60) Provisional application No. 63/246,897, filed on Sep. 22, 2021.

(51) Int. Cl.
*H04B 7/06* (2006.01)
*H01Q 3/26* (2006.01)

(52) U.S. Cl.
CPC ......... *H04B 7/0617* (2013.01); *H01Q 3/2605* (2013.01); *H04B 7/0639* (2013.01)

(58) Field of Classification Search
CPC .................................................. H04B 7/0617
USPC ......................................................... 375/267
See application file for complete search history.

(56) References Cited

U.S. PATENT DOCUMENTS

| | | | | |
|---|---|---|---|---|
| 2002/0140616 A1* | 10/2002 | Kanamaluru | ............ | H01Q 5/42 343/756 |
| 2007/0226287 A1* | 9/2007 | Lin | ...................... | H04B 7/0478 708/490 |
| 2011/0070918 A1* | 3/2011 | Hafeez | ................. | H04B 7/0452 455/67.11 |
| 2013/0022021 A1* | 1/2013 | Wild | .................... | H04B 7/0639 370/330 |
| 2020/0099426 A1* | 3/2020 | Simonsson | .......... | H04B 7/0697 |
| 2023/0258703 A1* | 8/2023 | Wen | .................... | G01R 29/0814 324/637 |

OTHER PUBLICATIONS

Love, D. J., Heath, R. W., & Strohmer, T. (Oct. 14, 2003). Grassmannian beamforming for multiple-input multiple-output wireless systems. IEEE transactions on information theory, 49(10), 2735-2747.

(Continued)

*Primary Examiner* — Lihong Yu
(74) *Attorney, Agent, or Firm* — Joseph Kolodka (57) ABSTRACT

A method of communicating between a transmitter and a receiver in a wireless communication system is provided. The method includes selecting a beamformer from a beamforming codebook. The method further includes transmitting a signal from antenna elements using the selected beamformer by adjusting a gain and a phase of the signal. The antenna elements correspond to an absolute value and an angle of a respective complex beamforming coefficient from the selected beamformer. The beamformer is a composite beam including a plurality of disjoint beam lobes, and each of the plurality of disjoint beam lobes covers a desired angular interval.

16 Claims, 7 Drawing Sheets

(56) References Cited

OTHER PUBLICATIONS

Nitsche, T., Flores, A. B., Knightly, E. W., & Widmer, J. (Apr. 26, 2015). Steering with eyes closed: mm-wave beam steering without in-band measurement. In 2015 IEEE Conference on Computer Communications (INFOCOM) (pp. 2416-2424). IEEE.

Noh, S., Zoltowski, M. D., & Love, D. J. (Jun. 13, 2017). Multi-resolution codebook and adaptive beamforming sequence design for millimeter wave beam alignment. IEEE Transactions on Wireless Communications, 16(9), 5689-5701.

Khalili, A., Shahsavari, S., Khojastepour, M. A. A., & Erkip, E. (Jun. 21, 2020). On optimal multi-user beam alignment in millimeter wave wireless systems. In 2020 IEEE International Symposium on Information Theory (ISIT) (pp. 2953-2958). IEEE.

Shahsavari, S., Khojastepour, M. A. A., & Erkip, E. (Sep. 8, 2019). Beam training optimization in millimeter-wave systems under beamwidth, modulation and coding constraints. In 2019 IEEE 30th Annual International Symposium on Personal, Indoor and Mobile Radio Communications (PIMRC) (pp. 1-7). IEEE.

Khojastepour, M. A. A., Shahsavari, S., Khalili, A., & Erkip, E. (Nov. 1, 2020). Multi-user beam alignment for millimeter wave systems in multi-path environments. In 2020 54th Asilomar Conference on Signals, Systems, and Computers (pp. 549-553). IEEE.

Shahsavari, S., Khojastepour, M. A. A., & Erkip, E. (Jun. 3, 2019). Robust beam tracking and data communication in millimeter wave mobile networks. In 2019 International Symposium on Modeling and Optimization in Mobile, Ad Hoc, and Wireless Networks (WIOPT) (pp. 1-8). IEEE.

Nosrati, M., Shahsavari, S., & Tavassolian, N. (Jun. 14, 2018). Multi-target vital-signs monitoring using a dual-beam hybrid Doppler radar. In 2018 IEEE International Microwave Biomedical Conference (IMBioC) (pp. 58-60). IEEE.

Nosrati, M., Shahsavari, S., Lee, S., Wang, H., & Tavassolian, N. (Jan. 22, 2019). A concurrent dual-beam phased-array Doppler radar using MIMO beamforming techniques for short-range vital-signs monitoring. IEEE Transactions on Antennas and Propagation, 67(4), 2390-2404.

Atapattu, S., Fan, R., Dharmawansa, P., Wang, G., Evans, J., & Tsiftsis, T. A. (Jul. 10, 2020), Reconfigurable intelligent surface assisted two-way communications: Performance analysis and optimization. IEEE Transactions on Communications, 68(10), 6552-6567.

Song, J., Choi, J., & Love, D. J. (Jun. 8, 2015). Codebook design for hybrid beamforming in millimeter wave systems. In 2015 IEEE International Conference on Communications (ICC) (pp. 1298-1303). IEEE.

Hur, S., Kim, T., Love, D. J., Krogmeler, J. V., Thomas, T. A., & Ghosh, A. (Sep. 16, 2013). Millimeter wave beamforming for wireless backhaul and access in small cell networks. IEEE transactions on communications, 61(10), 4391-4403.

\* cited by examiner

CODEBOOK DESIGN FOR COMPOSITE BEAMFORMING IN NEXT-GENERATION mmWave SYSTEMS

RELATED APPLICATION INFORMATION

This application claims priority to U.S. Provisional Patent Application No. 63/246,897, filed on Sep. 22, 2021, incorporated herein by reference in its entirety.

BACKGROUND

Technical Field

The present invention relates to communications systems and more particularly to codebook design for composite beamforming in next-generation mmWave systems.

Description of the Related Art

In pursuance of the unused spectrum in higher frequencies, millimeter wave (mmWave) bands have a pivotal role. However, the high path-loss and poor scattering associated with mmWave communications highlight the necessity of employing effective beamforming techniques.

SUMMARY

According to aspects of the present invention, a method of communicating between a transmitter and a receiver in a wireless communication system is provided. The method includes selecting a beamformer from a beamforming codebook. The method further includes transmitting a signal from antenna elements using the selected beamformer by adjusting a gain and a phase of the signal. The antenna elements correspond to an absolute value and an angle of a respective complex beamforming coefficient from the selected beamformer. The beamformer is a composite beam including a plurality of disjoint beam lobes, and each of the plurality of disjoint beam lobes covers a desired angular interval.

According to other aspects of the present invention, a base station in a wireless communication system is provided. The base station includes a memory device for storing program code. The base station further includes a hardware processor operatively coupled to the memory device for running the program code to select a beamformer from a beamforming codebook. The hardware processor further runs the program code to transmit a signal from antenna elements using the selected beamformer by adjusting a gain and a phase of the signal. The antenna elements correspond to an absolute value and an angle of a respective complex beamforming coefficient from the selected beamformer. The beamformer is a composite beam including a plurality of disjoint beam lobes, and each of the plurality of disjoint beam lobes covers a desired angular interval.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to codebook design for composite beamforming in next-generation mmwave systems.

Embodiments of the present invention propose an algorithm to design a composite beam, i.e., a beam comprised of multiple non-neighboring angular coverage intervals (ACIs), say in azimuth direction, of possibly different widths. The composite beams are not only important as a data communication beams, but they can also facilitate the beam search. A codebook of composite beams, composite codebook, is designed for a set of composite beams that are defined over a set of desired ACIs ACI set.

Each entry of the codebook is a beamforming vector that generates a composite beam defined as a beam which covers a union of disjoint ACIs out of a set of all desired ACIs. Such composite codebook can be used in variety of applications in next-generation mmWave communications such as user tracking, target monitoring, 5G positioning, two-way communications, design of reconfigurable intelligent surfaces, etc. The composite codebook design problem may be also viewed as generalized version of the codebook design problem where the angular range under study is divided into equal-length ACIs and each codeword is supposed to cover only a single ACI.

Notations: Throughout, $\mathbb{C}$ denotes the set of complex numbers, $\mathcal{CN}(m,\sigma^2)$ denotes the complex normal distribution with mean m and variance $\sigma^2$, [a,b] is the closed interval between a and b, $1_{a,b}$ is the a×b all ones matrix, $I_N$ is the N×N identify matrix, ceil(.) is the ceiling function, $\mathbb{1}_{(a,b)}$ is the indicator function, $\|\cdot\|$ is the 2-norm, |.| is the 1-norm, $\odot$ is the Hadamard product, $\otimes$ is the Kronecker product, $A^H$ and $A_{a,b}$ denote conjugate transpose, and $(a,b)^{th}$ entry of A.

Figure 1:
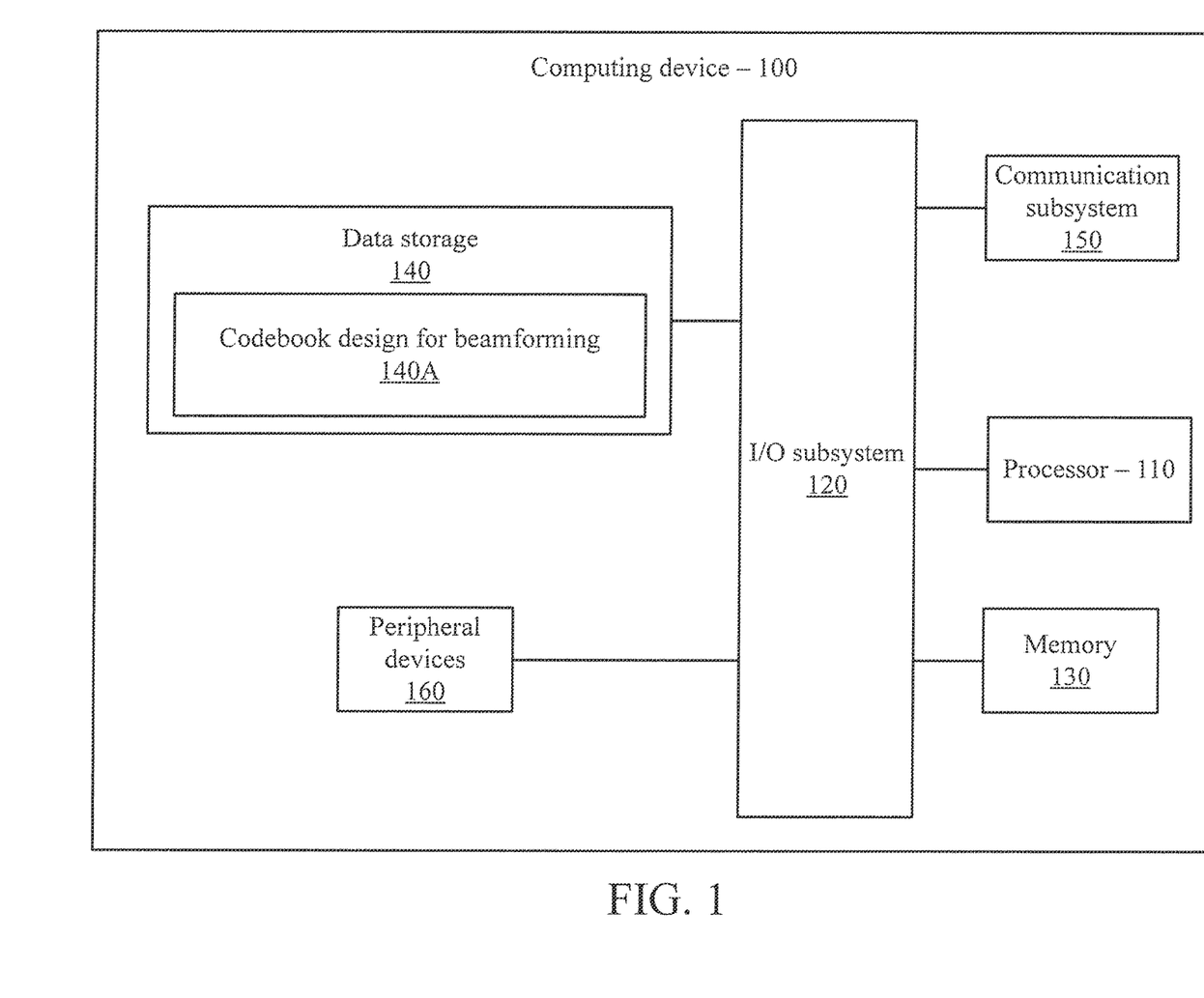
FIG. 1 is a block diagram showing an exemplary computing device, in accordance with an embodiment of the present invention.

FIG. 1 is a block diagram showing an exemplary computing device 100, in accordance with an embodiment of the present invention. Computing device 100 can be base station 210A in FIG. 2, in accordance with one implementation. The computing device 100 is configured to perform codebook design for composite beamforming.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for codebook design for composite beamforming. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
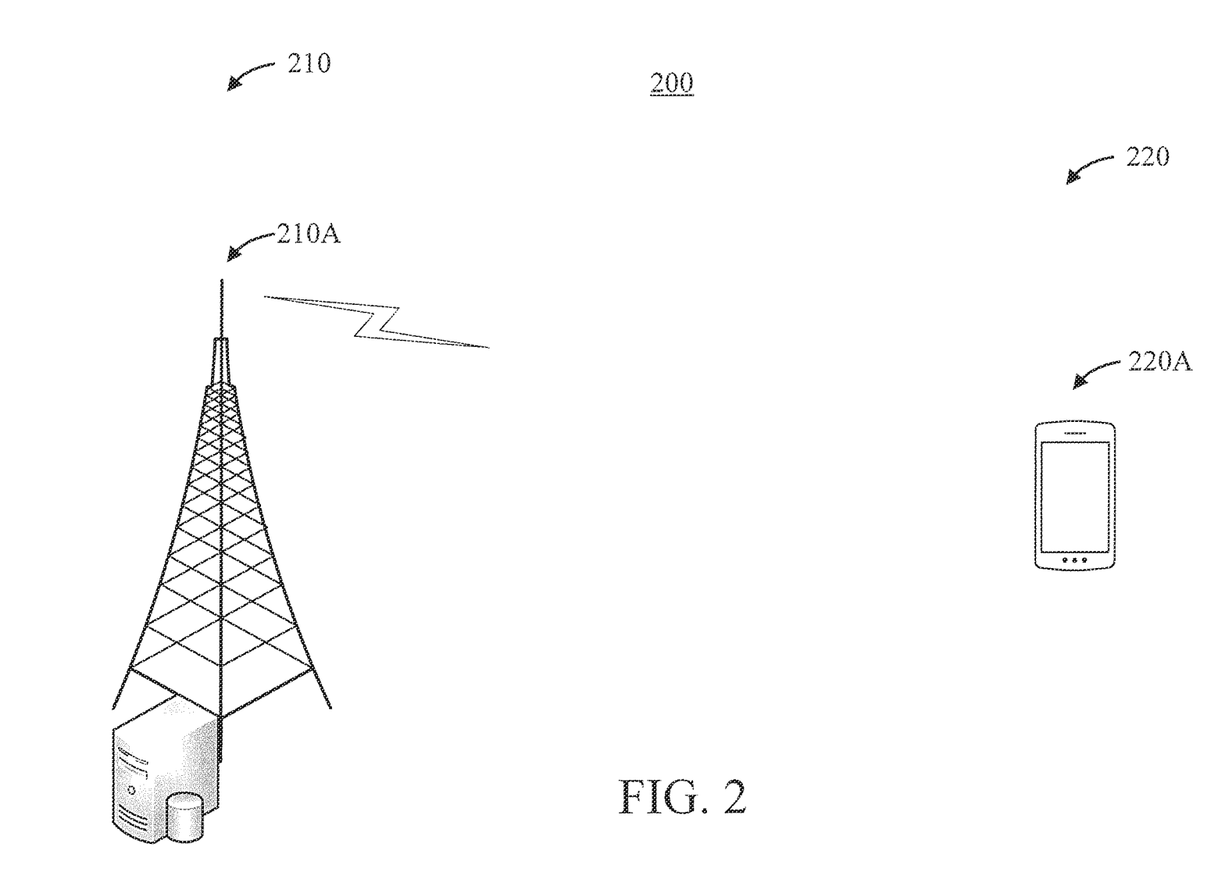
FIG. 2 is a block diagram showing an exemplary environment, in accordance with an embodiment of the present invention.

These and other variations of a hardware processor subsystem are also contemplated in accordance with embodiments of the present invention System Model
Channel Model FIG. 2 is a block diagram showing an exemplary environment 200, in accordance with an embodiment of the present invention.

We consider a mmWave channel between a multi-antenna base station (BS) 210A on the transmitter side 210 and a single-antenna user equipment (UE) 220A on the receiver side 220. The channel is defined as follows:

$$y = \sqrt{\rho} h^H cs + n \quad (1)$$

where ρ denotes the system signal-to-noise ratio (SNR), $h \in \mathbb{C}^{M_t}$ the block fading channel vector, $c \in \mathbb{C}^{M_t}$ the unit-norm digital beamforming array ($\|c\|=1$), $s \in \mathbb{C}$ the input signal, and $n \sim \mathcal{CN}(0,1)$, the additive white complex Gaussian noise. Under the hybrid beamforming scheme, it holds that $c = Fv$, where $F = [f_1, \ldots, f_{N_{RF}}] \in \mathbb{C}^{M_t \times N_{RF}}$, where F is an analog beamsteering matrix only capable of phase shifting, where all the vectors $f_n$, $n=1 \ldots N_{RF}$ are subject to the equal gain constraint defined as $|f_n^{(m)}|=1$, $m=1 \ldots M_t$, and $v \in \mathbb{C}^{N_{RF}}$ is the baseband beamforming vector. Similarly, the unit-norm constraint on c, enforces that $\|F_v\|=1$.

Beamforming Model

We consider the design of physical beams that are steered in azimuth plane where the beams are supposed to cover one (or multiple disjoint) ACIs. An ACI covering the angular range from $\theta_b^s$ to $\theta_b^f$ is denoted by $\omega_b = [\theta_b^s, \theta_b^f)$ where $\theta_b^c = (\theta_b^s + \theta_b^f)/2$, and $\lambda_b = |\theta_b^s - \theta_b^f|$ are the center and beamwidth associated with the beamlobe covered by this ACI. It is presumed that $\theta \in [-\pi, 0]$. Further, the change of variable $\psi = \pi \cos \theta$. We have $\psi \in [-\pi, \pi]$, and each beam is represented by $\omega_b^\varphi = [\varphi_b^s, \varphi_b^f)$ in the ψ-domain, where $\varphi_b^a = \pi \cos \theta_b^a$, $a \in \{s, f\}$. Further define $\delta_b = |\varphi_b^s - \varphi_b^f|$. Hereinafter, it is preferred to work with the beams over the ψ-domain unless otherwise stated.

Let $\mathcal{A}$ denote the set of ACIs defined for a given codebook design problem. Let each element of $\mathcal{A}$ be denoted by an index. A beam is denoted by $\mathcal{B}(B) = \{w_b\}_{b \in B}$, where B is the set of indices of non-neighboring ACIs. A set of ACIs is non-neighboring if any pair of ACIs in that set are not neighbors, i.e., the starting angle of one beam is not equal to the ending angle of the other beam. A beam is called single beam (composite beam) if $|B|=1$ ($|B|>1$).

Figure 3:
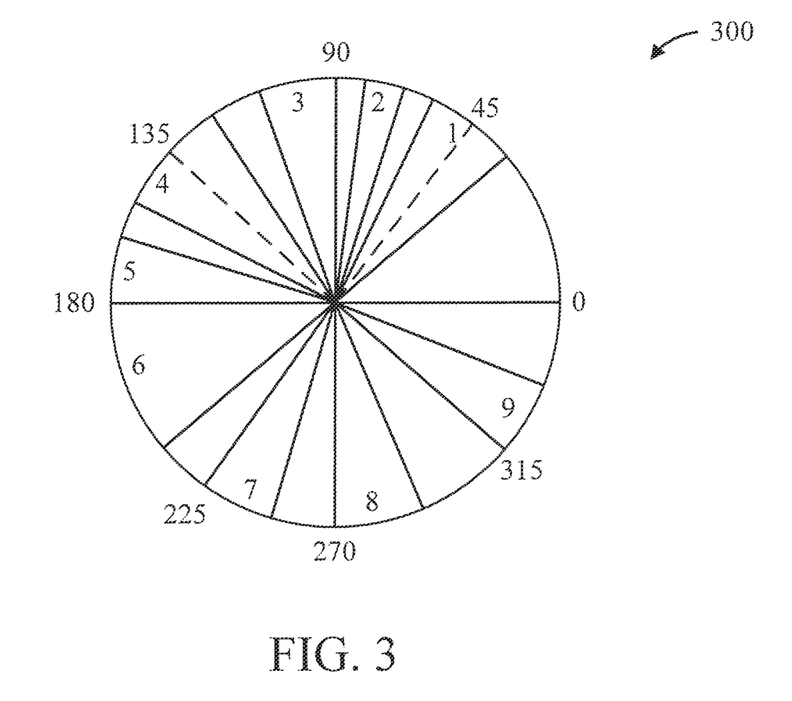
FIG. 3 is a diagram showing a hypothetical ACI set given as the input to the codebook design problem, in accordance with an embodiment of the present invention.
Figure 4:
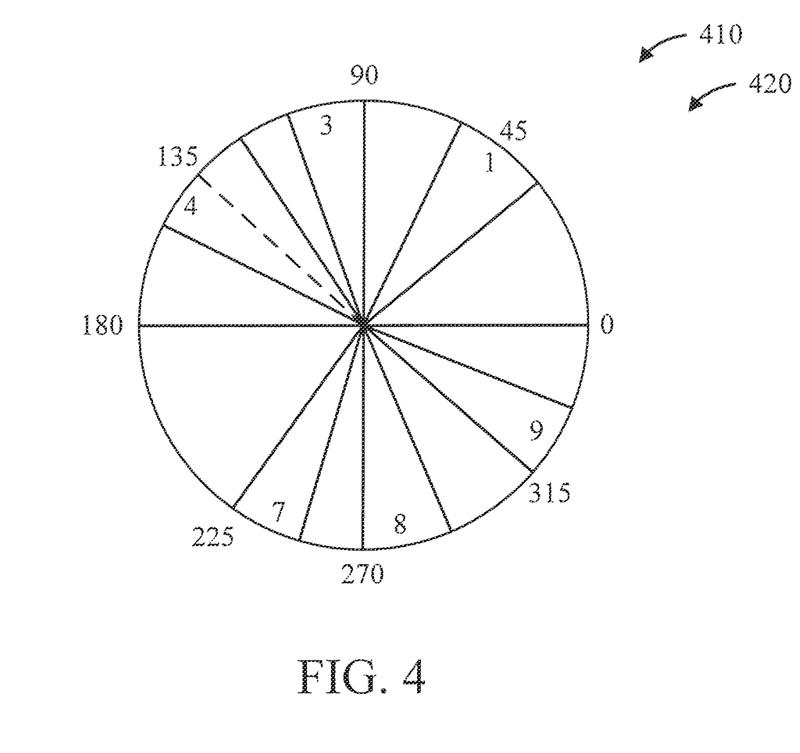
FIG. 4 is a diagram showing two potentially desired composite beams $\mathcal{B}(B_1)$, $\mathcal{B}(B_2) \subseteq \mathcal{A}$, in accordance with an embodiment of the present invention.

Example 1. One example of this setting is shown in FIGS. 3-4. FIG. 3 is a diagram showing a hypothetical ACI set 300 given as the input to the codebook design problem, in accordance with an embodiment of the present invention. We have the following:

$$\mathcal{A} = \left\{ \left[\frac{\pi}{6}, \frac{\pi}{3}\right), \left[\frac{19\pi}{48}, \frac{23\pi}{48}\right), \left[\frac{\pi}{2}, \frac{5\pi}{8}\right), \left[\frac{11\pi}{16}, \frac{13\pi}{16}\right)\left[\frac{7\pi}{8}, \pi\right), \left[\frac{-7\pi}{8}, \frac{-19\pi}{4}\right), \left[\frac{-3\pi}{4}, \frac{-5\pi}{8}\right), \left[\frac{-\pi}{2}, \frac{-3\pi}{8}\right), \left[\frac{-\pi}{4}, \frac{-\pi}{8}\right) \right\}$$

FIG. 4 is a diagram showing two potentially desired composite beams $\mathcal{B}(B_1)$, $\mathcal{B}(B_2) \subseteq \mathcal{A}$, in accordance with an embodiment of the present invention. We have the following:

$$\mathcal{B}(B_1) = \left\{ \left[\frac{\pi}{6}, \frac{\pi}{3}\right), \left[\frac{\pi}{2}, \frac{5\pi}{8}\right), \left[\frac{-3\pi}{4}, \frac{-5\pi}{8}\right) \right\}$$

$$\mathcal{B}(B_2) = \left\{ \left[\frac{11\pi}{16}, \frac{13\pi}{16}\right), \left[\frac{-\pi}{2}, \frac{-3\pi}{8}\right), \left[\frac{-\pi}{4}, \frac{-\pi}{8}\right) \right\}$$

where $B_1 = \{1,3,7\}$, and $B_2 = \{4,8,9\}$. $B_1$ is denoted by reference numeral 410, and $B_2$ is denoted by reference numeral 420.

Example 2. One may be interested in designing a codebook where the beamwidth of each beam, whether single or composite, has a resolution of, e.g., $$\frac{\pi}{8},$$

and is not larger than $$\frac{\pi}{2}.$$

In this case, the ACI set $\mathcal{A}$ includes all ACIs like $w_b = [\theta_b^s, \theta_b^f)$ with beamwidth $$\lambda_b \in \left\{ \frac{\pi}{8}, \frac{\pi}{4}, \frac{3\pi}{8}, \frac{\pi}{2} \right\} \text{ and } \theta_b^s = \frac{k\pi}{8}, k \in \mathbb{Z}_{\geq 0}.$$

The first example shows the intuition behind our beamforming setting given an arbitrary ACI list. The second example highlights the case where the ACIs are overlapping.

Further, we say a vector g of length L is a geometric vector with parameter ρ if and only if it can be written as follows:

$$g = [1, e^{j\rho}, \ldots, e^{j(L-1)\rho}] \quad (2)$$

Antenna Array Model

We consider two different antenna configurations, namely uniform linear array (ULA), and twin-ULA (TULA).

Figure 5:
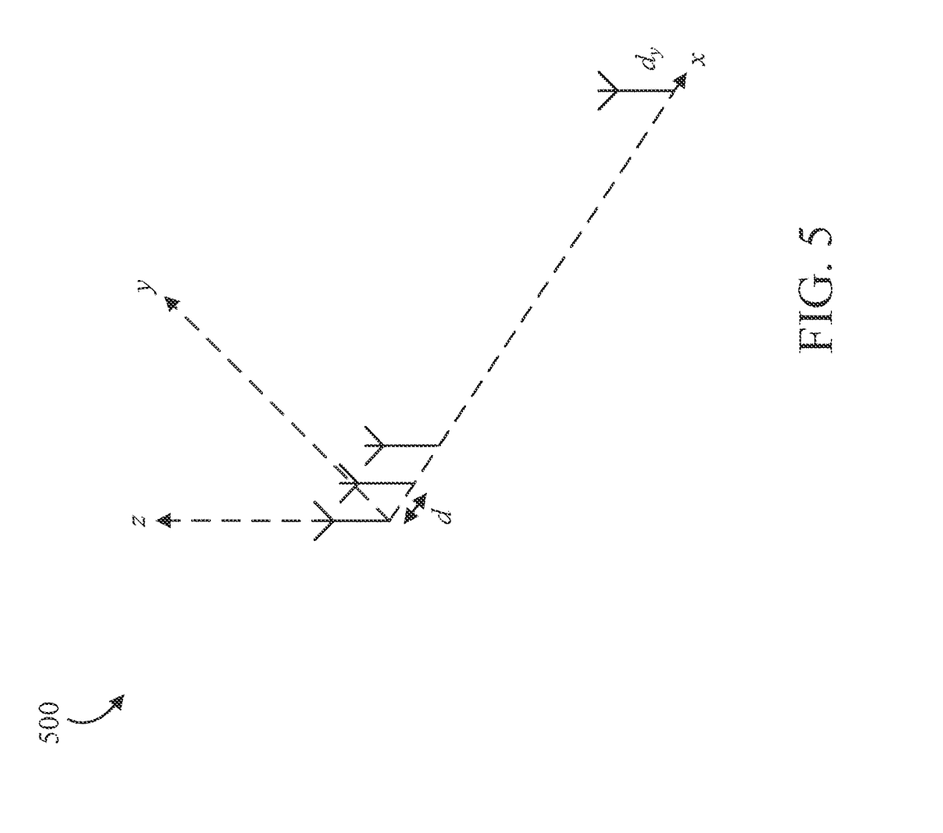
FIG. 5 is a diagram showing an example Uniform Linear Array (ULA) antenna configuration, in accordance with an embodiment of the present invention.

FIG. 5 is a diagram showing an example Uniform Linear Array (ULA) antenna configuration 500, in accordance with an embodiment of the present invention.

Figure 6:
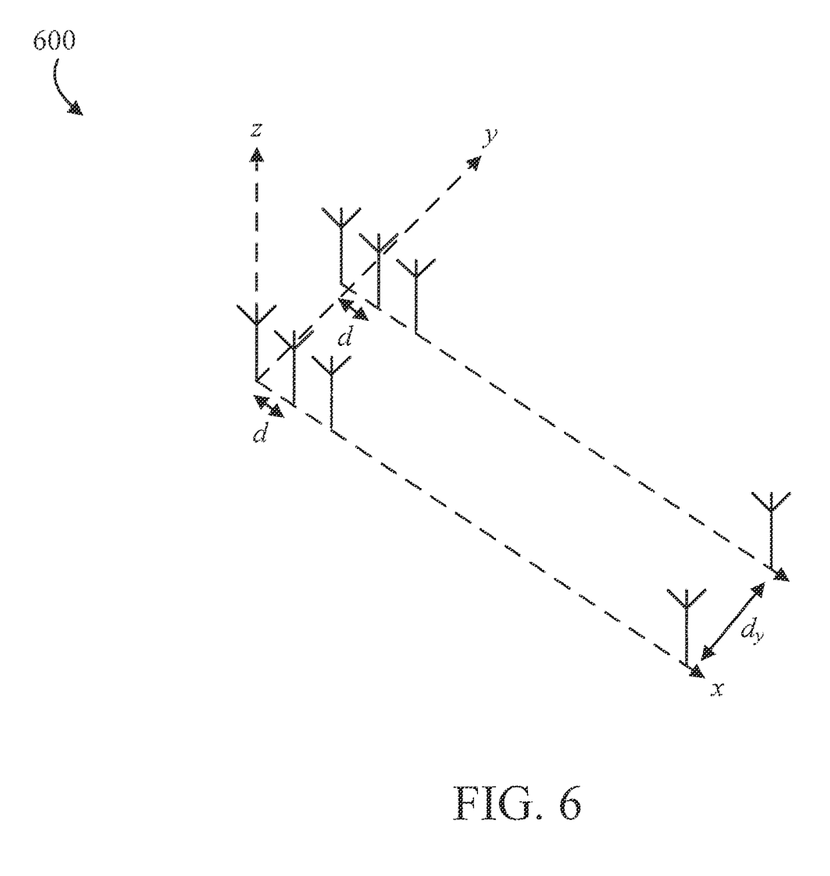
FIG. 6 is a diagram showing an exemplary Twin Uniform Linear Array (TULA) antenna configuration, in accordance with an embodiment of the present invention.

FIG. 6 is a diagram showing an exemplary Twin Uniform Linear Array (TULA) antenna configuration 600, in accordance with an embodiment of the present invention.

Under the ULA structure the antennas are placed uniformly along the x-axis, where each antenna has a distance of d from its previous (next) antenna. However, under the TULA structure, the antennas are arranged in two ULAs that are placed in parallel to the x-axis, and with a distance of $d_y$ along the y-axis. Herein, we consider half-wavelength ULAs, i.e., $$d = \frac{\lambda}{2}.$$

Moreover, under TULA we set $$d_y = \frac{\lambda}{3}.$$

For each beamformer c, under the ULA structure, the reference gain $G^{ula}(\psi, c)$ at every given direction ψ is given by the following:

$$G^{ula}(\psi, c) = |d_{ula, M_t}^H(\psi) c|^2 \quad (3)$$

where $d_{ula, M_t}(\psi)$ is the array response vector (directivity) of the ULA in that direction and is given by the following:

$$d_{ula, M_t}(\psi) = [1, e^{j\psi}, \ldots, e^{j(M_t - 1)\psi}]^T \quad (4)$$

Similarly, under the TULA structure it holds that $$G^{tula}(\psi, c) = |d_{tula, M_t}^H c|^2 \quad (5)$$

where the directivity of the TULA is given by the following:

$$d_{tula, M_t}(\psi, \phi) = \quad (6)$$

$$\left[ d_{ula, \frac{M_t}{2}}^T(\psi), e^{j\phi} d_{ula, \frac{M_t}{2}}^T(\psi) \right]^T \text{ with } \phi = \frac{2\pi}{3} \sin\theta = \frac{2\pi}{3}\sqrt{1 - \psi^2}.$$

Composite Codebook Design Problem

Let $c_b$ be the codeword corresponding to the beam $\mathcal{B}$ (B). Using the Parseval's theorem, it is straightforward to write the following:

$$\int_{-\pi}^{\pi} G(\psi,c) d\psi = 2\pi \|c\|^2 = 2\pi \quad (7)$$

Applying the last equation to the ideal gain corresponding to the codeword $c_b$ we get the following:

$$\int_{-\pi}^{\pi} G_{ideal,B}(\psi) d\psi = \quad (8)$$

$$\int_{\mathcal{B}(B)} t d\psi + \int_{[-\pi,\pi]\setminus\mathcal{B}(B)} 0 d\psi = \sum_{b \in B} \int_{w_b^\psi} t d\psi = \sum_{b \in B} \delta_b t = 2\pi$$

Therefore, $$t = \frac{2\pi}{\Delta B},$$

where $\Delta B = \sum_{b \in B} \delta_b$. The following follows:

$$G_{ideal,B}(\psi) = \frac{2\pi}{\Delta B} \mathbb{1}_{\mathcal{B}\psi(B)}(\psi), \quad \psi \in [-\pi, \pi] \quad (9)$$

We wish to find the optimal configuration $c_B$ for the antenna array such that $G(\psi,c)$ becomes the most accurate estimate of $G_{ideal,B}(\psi)$. To this end, we formulate the codebook design problem as a MSE as follows:

$$c_B^{opt} = \arg \min_{c, \|c\|=1} \int_{-\pi}^{\pi} |G_{ideal,B}(\psi) - G(\psi, c)| d\psi \quad (10)$$

In order to solve the above optimization problem, we rewrite the integral in Equation (10) as the equivalent infinite series as follows:

$$c_B^{opt} = \arg \min_{c, \|c\|=1} \left[ \lim_{L \to \infty} \frac{2\pi}{L} \sum_{\ell=1}^{L} |G_{ideal,B(\psi_\ell)} - G(v_\ell c)| \right] \quad (11)$$

where $\psi = [\psi_1, \ldots, \psi_L]$ is the vector corresponding to the sampled $\psi$-domain, i.e., $$\psi_L = -\pi + \ell\left(\frac{2\pi}{L}\right),$$

$\ell = 1, \ldots, L$. Also, let $\psi_b$ be the elements of $\psi$ that lie in $\omega_b$. It holds that $|\psi| = L$, and $\psi_b$ is comprised of $|\psi_b| = L_b$, $b \in B$ consecutive elements of $\psi$. We can rewrite the optimization problem in equation (11) as follows:

$$c_B^{opt} = \arg \min_{c, \|c\|=1} \lim_{L \to \infty} \frac{1}{L} |G_{ideal,B} - G(c)|$$

where $$G(c) = [G(\psi_1, c) \ldots G(\psi_L, c)]^T \in \mathbb{Z}^L$$

and $$G_{ideal,B} = [G_{ideal,B}(\psi_1) \ldots G_{ideal,B}(\psi_L) \odot]^T \in \mathbb{Z}^L$$

Observe that each beam $\mathcal{B}$ (B) divides the angular interval in $2|B|$ regions, $|B|$ of which cover the designed ACIs. Define $e_B(b) \in \mathbb{Z}^{2|B|}$ to be the standard basis vector corresponding to the representation of beam b in the set $\{1, \ldots, 2|B|\}$. For instance, in the example described by FIG. 3, we have $$e_B\left(\left[\frac{\pi}{2}, \frac{5\pi}{8}\right]\right) = [0, 0, 1, 0, 0, 0]^T, \text{ or } e_B\left(\left[\frac{-\pi}{2}, \frac{\pi}{8}\right]\right) = [0, 0, 0, 0, 1, 0]^T.$$

Utilizing this notation, we can then write the following:

$$G_{ideal,B} = \sum_{b \in B} \frac{2\pi}{\Delta_B} (e_B(b) \otimes 1_{L_b,1}) \quad (13)$$

Now observe that for any equal gain $g \in \mathbb{C}^{L_b}$ it holds that $1_{L_b,1} = g \odot g^*$. Therefore, for such choice of g we can write:

$$G_{ideal,B} = \sum_{b \in B} \frac{2\pi}{\Delta_B} (e_B(b) \otimes (g_b \odot g_b^*)) \quad (14)$$

$$= \sum_{b \in B} (\gamma b(e_b(b) \otimes g_b)) \odot (\gamma b(e_B(b) \otimes g_b))^*$$

$$= \left(\sum_{b \in B} \gamma b(e_B(b) \otimes g_b)\right) \odot \left(\sum_{b \in B} \gamma b(e_B(b) \otimes g_b)\right)^*$$

Similarly, one can easily verify the following:

$$G(c) = (D^H c) \odot (D^H c)^* \quad (15)$$

where $D = [D_{M_t}(\psi_1) \ldots D_{M_t}(\psi_L)] \in \mathbb{C}^{M_t \times L}$. Given the special form of Equations (12) and (14) and their usage in the optimization problem entailed in Equation (15), it is straightforward to conclude that $c_B^{opt}$ is the solution to the following optimization problem for appropriate choices of $g_b$.

Problem 1. Given any set of equal-gain vectors $g_b \in \mathbb{C}^{L_b}$, $b \in B$ find vector $c_B \in \mathbb{C}^{M_t}$ such that $$c_B = \arg \min_{c, \|c\|=1} \lim_{L \to \infty} \left\| \sum_{b \in B} \gamma b(e_B(b) \otimes g_b) - D^H c \right\|^2$$

However, in order to find the optimal solution to the optimization problem in Equation (12), we need to find the optimal choices of $g_b$, $b \in B$. Utilizing Equation (14) and (15), the following optimization problem arises.

Problem 2. Find a set of equal-gain $g_b \in \mathbb{C}^{L_b}$, i.e., $G_B$ such that $$\mathcal{G}_B = \arg \min_{\mathcal{G}} \left\| \text{abs}(D^H c_B) - \text{abs}\left(\sum_{b \in B} \gamma b(e_B(b) \otimes g_b)\right) \right\|^2 \quad (17)$$

where $G_B = \{g_b | b \in B\}$, and abs(.) denotes the element-wise absolute value of a vector.

Therefore, under the fully-digital scheme, by solving problems 2 and 1, the optimal configuration $c_B^{opt}$ for composite beam $\mathcal{B}$ (B) can be obtained. However, under the hybrid beamforming regime, the optimal configuration is found as follows.

$$F_B, v_b = \arg \min_{f,v} \|Fv - c_B^{opt}\|^2 \quad (18)$$

under the equal gain condition on the columns of $F_B$. Effective orthogonal Matching Pursuit (OMP) can be used to obtain near-optimal solutions to the above problem.

Proposed Codebook Design Method

Observe that for each fixed value of L problem 1 falls in the class of least-square optimization problems. Therefore, as L tends to infinity, $c_B$ is obtained as the limit of the solutions to this problem. For each L, the solution is given the following:

$$c_B^{(L)} = \sum_{b \in B} \gamma b (DD^H)^{-1} D(e_B(b) \otimes g_b) \quad (19)$$

$$c_B^{(L)} = \frac{1}{L} \sum_{b \in B} \gamma b D(e_B(b) \otimes g_b) \quad (20)$$

where it holds that $$DD^H = \sum_{l=1}^{L} d_{M_t}(\psi_l) d_{M_t}^H(\psi_l) = \sum_{l=1}^{L} I_{M_t} = L I_{M_t}$$

Define $$\Gamma_b = \sum_{b \in B} \gamma b (e_B(b) \otimes g_b).$$

Replacing $\Gamma_b$ and Equation (2) in Equation (17) the following is obtained:

$$\mathcal{G}_B = \arg \min_{\mathcal{G}} \| \text{abs}\left(\frac{D^H D}{L} \Gamma_b\right) - \text{abs}(\Gamma_b) \|^2 \quad (21)$$

Proposition 3. The minimizer of Equation (21) is in the form of geometric vectors $g_b$, of lengths $L_b$, and parameters $$\rho_b = \frac{\eta \delta_b}{L},$$

$b \in B$ for some real value $\eta \geq 0$.

Let us expand the expression for $c_B(L)$ from Equation (20) to obtain the following:

$$c_{B(L)} = \sum_{b \in B} \frac{\gamma b}{L} \left( \sum_{\ell=1}^{L_b} g_{b,\ell} d_{M_t}(\psi_{b,\ell}) \right) \quad (22)$$

Further define the following:

$$c_b^{(L)} = \frac{\gamma b}{L} \sum_{\ell=1}^{L_b} g_{b,\ell} d_{M_t}(\psi_b, \ell) \quad (23)$$

The m-th element of the vector $$c_b = \lim_{L \to \infty} c_{b(L)},$$

i.e., $c_{b,m}$ is given by the following:

$$c_{b,m} = \sqrt{\frac{2\pi}{\Delta_B}} \lim_{L \to \infty} \frac{1}{L} \sum_{\ell=0}^{L_b - 1} g_{b,\ell} e^{jm\psi_{b,\ell}} \quad (24)$$

$$= \frac{\delta_b}{\sqrt{2\pi \Delta_B}} \lim_{L_b \to \infty} \frac{1}{L_b} \sum_{\ell=0}^{L_b - 1} g_{b,\ell} e^{jm\psi_{b,\ell}}$$

For sufficiently large L, we can write $$\psi_{\ell,b} = \psi_b^s + \ell\left(\frac{\delta_b}{L_b}\right).$$

Choosing $g_b$ as in proposition 3, the following is obtained:

$$c_{b,m} = \frac{\delta_b}{\sqrt{2\pi \Delta_B}} \lim_{L_b \to \infty} \frac{1}{L_b} \sum_{\ell=0}^{L_b - 1} e^{j\frac{\ell \eta \delta_b}{L_b}} e^{jm\left(\psi_b^s + \ell \frac{\delta_b}{L_b}\right)} \quad (25)$$

$$= \frac{\delta_b}{\sqrt{2\pi \Delta_B}} e^{jm(\psi_b^s)} \lim_{L_b \to \infty} \frac{1}{L_b} \sum_{\ell=0}^{L_b - 1} \alpha^{(\eta + m)\ell}$$

$$= \frac{\delta_b}{\sqrt{2\pi \Delta_B}} e^{jm(\psi_b^s)} \int_0^1 \alpha^{(\eta + m) L_b x} dx$$

where $$\alpha = e^{j\frac{\delta_b}{L_b}}.$$

After a few straightforward steps, the following is obtained:

$$c_{b,m} = \frac{\delta_b}{\sqrt{2\pi \Delta_B}} e^{j\left(m\psi_b^s + \frac{\xi}{2}\right)} \text{sinc}\left(\frac{\xi}{2\pi}\right) \quad (26)$$

where $\xi = \delta_b(\eta + m)$.

We note that the ULA antenna structure inherently generates two-sided lobes and hence generates efficient beams due to (i) having beam lobes in undesired scopes, and (ii) having lower effective beam gain in desired ACIs. Hereinafter, we discuss a beam design using TULA antenna structure. The TULA antenna structure not only can generate single sided beams, but also can improve the beam gain (by almost 3 dB).

Codebook Design Under Tula Setting

For some $\beta \in \mathbb{R}$ define the codeword under the TULA configuration as follows:

$$c_{b,twin} = \left[ c_{B,twin,\frac{M_t}{2}}^T, e^{j\beta} c_{B,twin,\frac{M_t}{2}}^T \right]^2 \quad (27)$$

Under such codeword, appealing to Equations (5) and (6), the corresponding reference gain can be rewritten as follows:

$$G(\theta, c_{B,twin}) = L(\theta)^2 \left| d_{\frac{M_t}{2}}^H(\theta) c_{B,twin,\frac{M_t}{2}} \right|^2 \quad (28)$$

where we define $$L(\theta) = \left|1 + e^{j(\beta - \frac{2\pi}{3} \sin(\theta))}\right| = \left|\cos\left[\frac{\beta}{2} - \frac{\pi}{3} \sin(\theta)\right]\right| \quad (29)$$

We note that the gain in Equation (28) includes two terms, one being the reference gain of a ULA of $$\frac{M_t}{2}$$

antennas (by setting the same codeword as in Equation (26)) and one being a function of the parameter $\beta$. As before, we use the first term to obtain the beamforming gain, and use the second term to provide the required level of isolation between each beam and its mirrored counterpart to resolve the inefficiency of the ULA structure. To capture the isolation requirement, the isolation factor $0 \leq \mu < 1$ is defined as follows:

$$\mu = \int_{w_b} \frac{L(-\theta)}{L(\theta)} d\theta = \int_{w_b} \frac{\cos\left(\frac{\beta}{2} + \frac{\pi}{3} \sin(\theta)\right)}{\cos\left(\frac{\beta}{2} - \frac{\pi}{3} \sin(\theta)\right)} d\theta \quad (30)$$

to denote the level of isolation between each $w_b$ and its mirrored counterpart. Opting for a small enough value for $\mu$, the optimal $\beta$ has to be obtained by numerically solving equation (3). Plugging in the obtained $\beta$ into Equation (27) completes the codebook design under the TULA structure.

Figure 7:
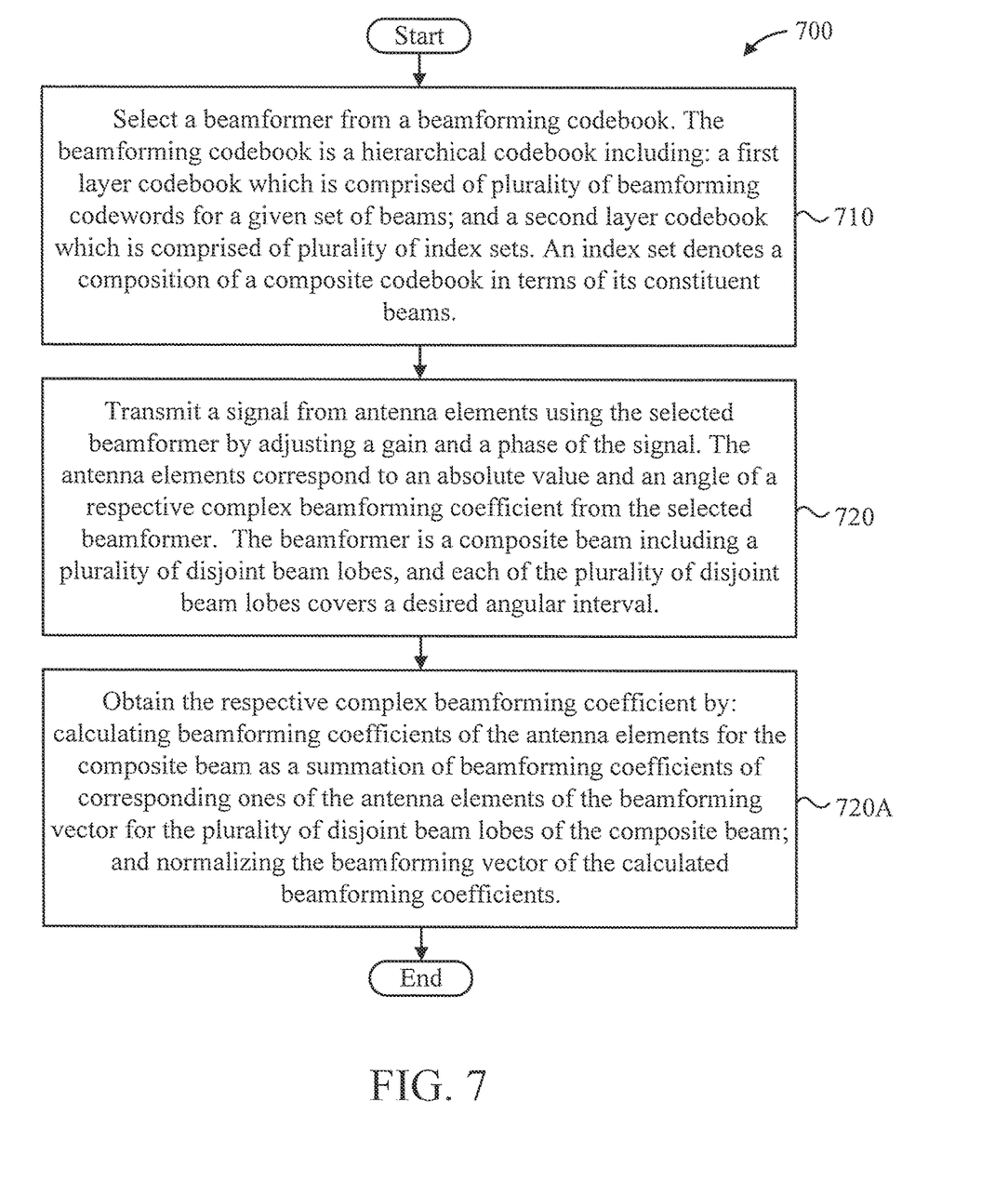
FIG. 7 shows an exemplary method 700 of communicating between a transmitter and a receiver in a wireless communication system, in accordance with an embodiment of the present invention.

FIG. 7 shows an exemplary method 700 of communicating between a transmitter and a receiver in a wireless communication system, in accordance with an embodiment of the present invention.

At block 710, select a beamformer from a beamforming codebook. The beamforming codebook is a hierarchical codebook including: a first layer codebook which is comprised of plurality of beamforming codewords for a given set of beams; and a second layer codebook which is comprised of plurality of index sets, wherein an index set denotes a composition of a composite codebook in terms of its constituent beams.

At block 720, transmit a signal from antenna elements using the selected beamformer by adjusting a gain and a phase of the signal. The antenna elements correspond to an absolute value and an angle of a respective complex beamforming coefficient from the selected beamformer. The beamformer is a composite beam including a plurality of disjoint beam lobes, and each of the plurality of disjoint beam lobes covers a desired angular interval.

In an embodiment, block 720 can include block 720A.

At block 720A, obtain the respective complex beamforming coefficient by: calculating beamforming coefficients of the antenna elements for the composite beam as a summation of beamforming coefficients of corresponding ones of the antenna elements of the beamforming vector for the plurality of disjoint beam lobes of the composite beam; and normalizing the beamforming vector of the calculated beamforming coefficients.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of communicating between a transmitter and a receiver in a wireless communication system, comprising:
    selecting a beamformer from a beamforming codebook; and
    transmitting a signal from antenna elements using the selected beamformer by adjusting a gain and a phase of the signal, the antenna elements corresponding to an absolute value and an angle of a respective complex beamforming coefficient from the selected beamformer, wherein the respective complex beamforming coefficient is obtained by:
        calculating beamforming coefficients of the antenna elements for a composite beam as a summation of beamforming coefficients of corresponding ones of the antenna elements of a beamforming vector for the plurality of disjoint beam lobes of the composite beam; and
        normalizing the beamforming vector of the calculated beamforming coefficients such that an absolute value of an m-th beamforming coefficient of the beamforming vector for a constituent beam lobe q is proportional to sinc($\delta q(\eta+m)$), wherein $\delta q$ and n are two constant values and sinc(x) is a function defined as sin(x)/x, where sin(x) is the sinusoidal function;
    wherein the beamformer is a composite beam comprised of a plurality of disjoint beam qlobes, and each of the plurality of disjoint beam lobes covers a desired angular interval.

2. The method of claim 1, wherein the antenna elements are arranged in tandem in two parallel lines of a particular distance, and wherein the antenna elements in a line from among the two parallel lines are uniformly placed.

3. The method of claim 2, wherein the antenna elements are dipole or cross-dipole or patch antennas.

4. The method of claim 2, wherein the beamforming coefficients of tandem ones of the antenna elements have a same absolute value.

5. The method of claim 4, wherein a difference in a phase of tandem ones of the antenna elements is set to achieve a desired isolation between a radiated signal in unwanted directions and intended directions.

6. The method of claim 1, wherein the beamforming codebook is a hierarchical codebook comprising:
a first layer codebook which is comprised of plurality of beamforming codewords for a given set of beams; and
a second layer codebook which is comprised of plurality of index sets, wherein an index set denotes a composition of a composite codebook in terms of its constituent beams.

7. The method of claim 1, wherein an absolute value of beamforming coefficients of a beamforming codeword is constant.

8. The method of claim 1, wherein a codeword of the beamforming codebook can be decomposed as a linear summation of a particular number of phase vectors, wherein a phase vector is a vector for which an absolute value of the elements of the vector is constant.

9. A base station in a wireless communication system, comprising:
a memory device for storing program code; and
a hardware processor operatively coupled to the memory device for running the program code to:
select a beamformer from a beamforming codebook; and
transmit a signal from antenna elements using the selected beamformer by adjusting a gain and a phase of the signal, the antenna elements corresponding to an absolute value and an angle of a respective complex beamforming coefficient from the selected beamformer, wherein the respective complex beamforming coefficient is obtained by the hardware processor by:
calculating beamforming coefficients of the antenna elements for a composite beam as a summation of beamforming coefficients of corresponding ones of the antenna elements of a beamforming vector for the plurality of disjoint beam lobes of the composite beam; and
normalizing the beamforming vector of the calculated beamforming coefficients such that an absolute value of an m-th beamforming coefficient of the beamforming vector for a constituent beam lobe q is proportional to $sinc(\delta q(n+m))$, wherein $\delta q$ and $\eta$ are two constant values and $sinc(x)$ is a function defined as $sin(x)/x$, where $sin(x)$ is the sinusoidal function;
wherein the beamformer is a composite beam comprised of a plurality of disjoint beam lobes, and each of the plurality of disjoint beam lobes covers a desired angular interval.

10. The base station of claim 9, wherein the antenna elements are arranged in tandem in two parallel lines of a particular distance, and wherein the antenna elements in a line from among the two parallel lines are uniformly placed.

11. The base station of claim 10, wherein the antenna elements are dipole or cross-dipole or patch antennas.

12. The base station of claim 10, wherein the beamforming coefficients of tandem ones of the antenna elements have a same absolute value.

13. The base station of claim 12, wherein a difference in a phase of tandem ones of the antenna elements is set to achieve a desired isolation between a radiated signal in unwanted directions and intended directions.

14. The base station of claim 9, wherein the beamforming codebook is a hierarchical codebook comprising:
a first layer codebook which is comprised of plurality of beamforming codewords for a given set of beams; and
a second layer codebook which is comprised of plurality of index sets, wherein an index set denotes a composition of a composite codebook in terms of its constituent beams.

15. The base station of claim 9, wherein an absolute value of beamforming coefficients of a beamforming codeword is constant.

16. The base station of claim 9, wherein a codeword of the beamforming codebook can be decomposed as a linear summation of a particular number of phase vectors, wherein a phase vector is a vector for which an absolute value of the elements of the vector is constant.

* * * * *